March 28, 1967     W. A. STAATS     3,311,552
CONTINUOUS BRINE PULSING SOFTENER
Filed Jan. 8, 1964
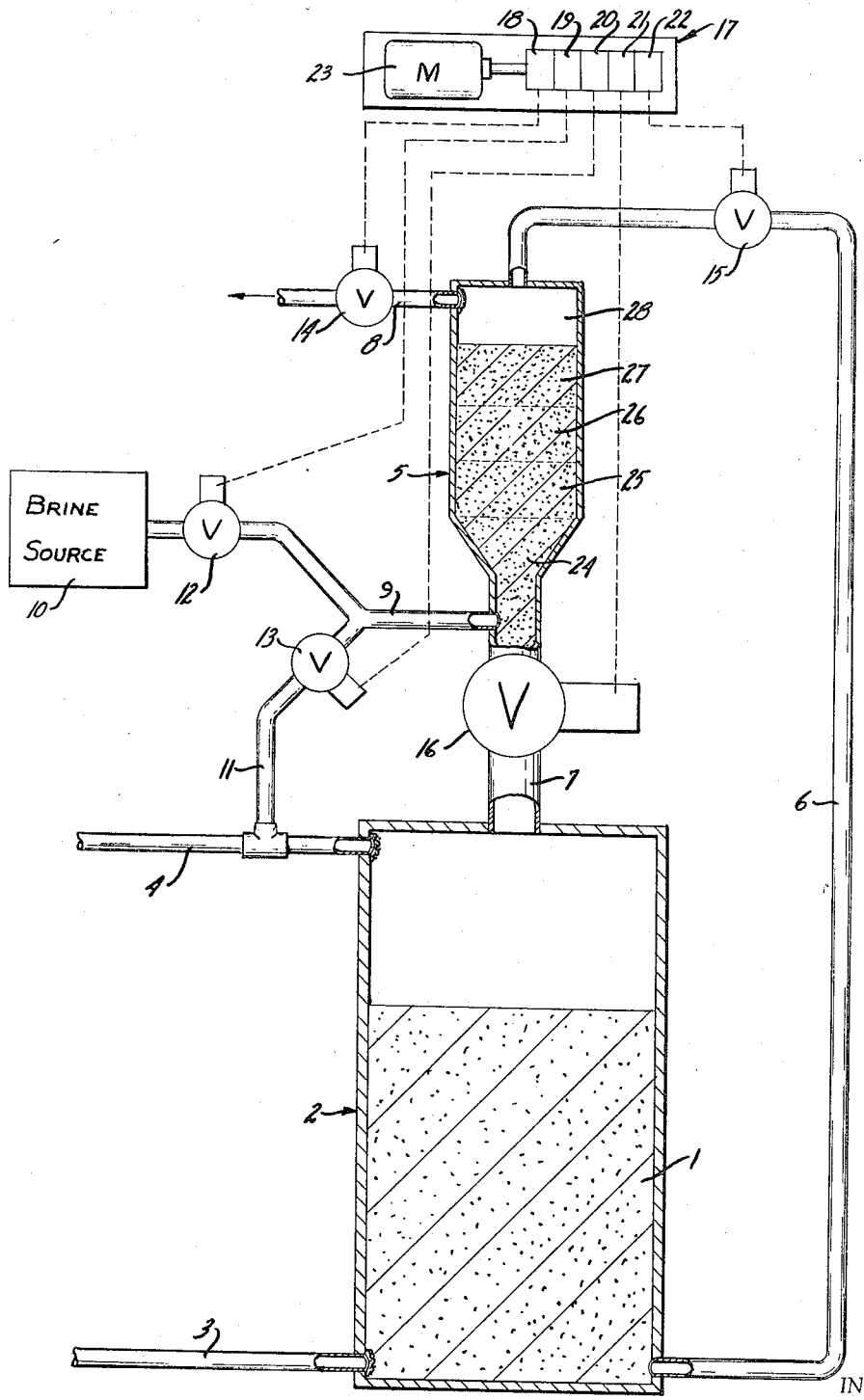
INVENTOR.
WILLIAM A. STAATS
BY
Ardrus & Starke
Attorneys

3,311,552
CONTINUOUS BRINE PULSING SOFTENER
William A. Staats, Torrance, Calif., assignor, by mesne assignments, to Culligan, Inc., North Brook, Ill., a corporation of Delaware
Filed Jan. 8, 1964, Ser. No. 336,481
6 Claims. (Cl. 210—33)

This invention relates to a method and apparatus for continuously regenerating an ion exchange bed for water softening or the like.

Water containing hardness ions such as calcium or magnesium may be softened for domestic and commercial application by passing the hard water through an ion exchange resin charged with sodium ions. In passing through the bed, sodium ions on the resin are exchanged for calcium and magnesium ions in the water and produce soft water at the outlet. Generally the resin is periodically or intermittently regenerated to remove the calcium and magnesium ions and again charge the bed with sodium ions by passing a strong solution of sodium chloride or brine therethrough. Such regeneration processes may take anywhere from thirty minutes to an hour or more and the softener must be taken out of service during the regeneration process.

To avoid such down time or discontinued softening operation, continuous softening processes have been suggested. For example, U.S. Patent 2,852,464 which issued Sept. 16, 1958, to C. H. Nordell, discloses a continuous softener wherein the resin is circulated through a separate regeneration chamber. An improved device for continuous softening is also disclosed in applicant's copending application entitled Automatic Regeneration of Treating Material and filed on Mar. 30, 1961 with Ser. No. 99,447, now U.S. Patent No. 3,220,552. The present invention is particularly directed to a continuous softening process to avoid the down time employed with a batch process and to further employ advantages of a pulse brining technique disclosed in applicant's copending application entitled, Method and Apparatus for Ion Exchange Regeneration, filed on even date herewith and assigned to a common assignee.

As disclosed in the latter application, the regeneration efficiency can be substantially increased by providing regeneration with a given quantity of brine solution subdivided into a plurality of time spaced pulses separated by fresh water rinses. As disclosed therein, the same quantity of brine as heretofore employed in regeneration processes when divided into subgroups, each of which contributes substantially to the regeneration of the resin, provides a much more efficient process.

In accordance with the present invention, a continuous regeneration process is provided in a system having a softening portion and a regenerating portion interconnected for movement of ion exchange material therebetween. Small increments of the material in the softening portion are intermittently removed from the softening portion of a system and preferably the inlet side thereof and transferred to the regenerating portion. The ion exchange material in the regenerating portion is sequentially subjected to a regeneration fluid and a rinse fluid within the regeneration chamber. A plurality of increments of the ion exchange material are maintained in the regeneration chamber and passed sequentially therethrough generally with the first introduced being the last removed. Thus, the exhausted ion exchange material which is withdrawn from the softening chamber is subjected to a plurality of brine pulses followed by rinse pulses such that the advantages of brine pulsing as set forth in applicant's copending application are provided.

However, the system further provides the advantages of a continuous softening process wherein soft water service is essentially continuously available. A longer time interval can then be employed to effect a regeneration of the ion exchange material with optimum utilization of the brine solution in accordance with the brine pulsing technique.

The drawing furnished herewith illustrates a method of carrying out the invention and clearly illustrates the advantages heretofore discussed as well as others which will be clear to those skilled in the water softening art.

The drawing is a diagrammatic illustration of a continuous softening system constructed in accordance with the present invention.

Referring to the drawing, the illustrated embodiment of the invention includes an ion exchange bed 1 supported within a softening tank 2. Bed 1 may be any suitable material such as resins presently employed in water softening systems. A screened incoming or hard water line 3 from an incoming water source, not shown, is secured to the bottom portion of the tank 2 to introduce hard water into the lower portion of the bed 1. A screened soft water outlet line 4 is connected to the upper portion of the tank 2 somewhat above the upper level of the bed 1. The hard water passes upwardly through the bed and out through the line 4 with the hardness causing ions in the water taken up by the bed 1 in exchange for sodium ions released by the bed 1, with soft water discharged to the consuming system, not shown. The exchange process eventually would deplete the bed 1 to the level where it would be ineffective. The resin bed 1 is therefore regenerated and in accordance with the present invention in a manner to permit continuation of the softening process by transferring an increment of the resin to a regeneration chamber 5. In the illustrated embodiment of the invention, chamber 5 is shown as a separate member disposed above the tank 2. A resin transfer conduit 6 is interconnected between the bottom portion of the tank 2 and the top portion of the regeneration chamber 5. When a proper path is provided, the incoming water at line 3 will cause a flow through the conduit 6 with a transfer of resin to the regeneration chamber 5. Within the regeneration chamber, the resin is regenerated as hereinafter described and eventually returned to the softener tank 2 via a return conduit 7 which is shown interconnecting the bottom of the generation chamber 5 to the top of the softening chamber or tank 2.

Generally, the regeneration chamber 5 includes a drain line 8 connected to the top portion thereof and a brine rinse line 9 connected to the bottom portion of the chamber. The line 9 is selectively connected to a brine source 10 or to a source of rinse water shown as the discharge side of the softening tank 2 via a line 11. A normally closed valve 12 is inserted between brine source 10 and line 9 and a normally closed valve 13 is inserted in line 11 for selective transfer of a brine solution or a fresh water rinse into the chamber 5. Valve 13 may have a small bleed hole, not shown, to pass a small amount of diluting water into chamber 5 with the brine solution. The brine solution and the rinse water pass upwardly through chamber 5 and outwardly through line 8. The latter includes a normally closed valve 14 for selective opening and closing of the drain line. Similarly, the transfer conduit 6 and the ion exchange material return conduit 7 includes individual normally closed valves 15 and 16, respectively, for selective opening of the respective lines.

In the illustrated embodiment of the invention, the several valves 12–16, inclusive, are illustrated as solenoid actuated valves with a timer 17 diagrammatically shown including a plurality of cam operated switch units 18–22, inclusive, for actuating the valves by selectively energizing and de-energizing the corresponding solenoids with the resulting opening and closing of the respective lines. A suitable timer motor 23 drives the cam operated switch units to provide proper timed operation. As such timing mechanisms are well known in the art, and the particular means for producing the action hereinafter described may also be manually or otherwise controlled, no further description of a specific timing mechanism or a specific circuit connection to the solenoid valves is given.

The resin within chamber 5 although a single continuous bed includes a plurality of separate and equal increments of the ion exchange material sequentially transferred from tank 2. The illustrated regeneration chamber or tank 5 consists of five resin processing sections 24, 25, 26, 27 and 28 one for each increment. In the condition shown, the uppermost section 28 does not contain any resin whereas sections 24-27, inclusive, form a continuous resin bed. This condition corresponds to a termination of a regeneration cycle wherein a previous increment has been returned to the tank 2. When timer 17 reaches a selected position, the cam switch units 18 and 22 energize and open valves 14 and 15 whereupon water flows from line 3 and tank 2 through the line 6, chamber section 28 and the drain line 8 to the waste outlet. The flow of water causes a transfer of an increment of the resin 1 into the chamber 28. The cam switch unit 22 holds valve 15 open for a timed period such that resin withdrawn from the bottom of the softening tank 2 substantially completely fills the section 28 with the increment corresponding to that shown as increment 24, 25, 26 or 27. At the end of the resin pumping period, the cam operated switch unit 22 is actuated to de-energize the solenoid 15 which returns to the normally closed position and terminates resin transfer. Switch unit 19 is then actuated to energize and open valve 12, connecting brine-rinse line 9 to the brine source 10. Brine then passes upwardly through all of the increments or sections 24 through 28 inclusive with the spent brine passing outwardly through the drain line 8. After the brining period, the cam switch unit 19 de-energizes and closes valve 12 to disconnect the brine source 10 and cam switch unit 20 is actuated to energize and open valve 13 to connect the rinse line 11 to line 9 and pass a fresh water rinse upwardly through each of the increments of resin material respective sections 24-28 in the chamber 5. After the brine is thoroughly rinsed from the regeneration chamber 5, the valve 13 again closes. Cam switch unit 21 is then actuated to energize and open valve 16 which opens the conduit 7 and allows the increment of ion exchange material in section 24 to drop downwardly into the tank onto the top of the ion exchange bed 1 with the other resin increments in sections 25, 26, 27 and 28 dropping downwardly to fill the adjacent sections 24, 25, 26 and 27. Valve 16 closes and returns the apparatus to the condition shown in the drawing at the end of the proper time or period, as a result of the timed operation of cam switch unit 21.

Thereafter, a new increment of exhausted resin from the bed 1 will be drawn from the tank 2 upwardly through and into the section 28 of the regeneration chamber 5 and the previously described cycle again completed. A second brine pulse will then be passed through the regeneration chamber and the resin in section 27 of chamber 5 is thus subjected to a second brine pulse followed by a second fresh water rinse. The resin in section 26 will be simultaneously subjected to a third brine and wash cycle, that in section 25 to a fourth brine and wash cycle and that in section 24 to a fifth brine and wash cycle. Thus, the regeneration process may be continuously or intermittently completed with each increment of resin given five brine pulses separated by fresh water rinses before being returned to service within the tank 2. The five brine step system may obviously be varied to any desired number by proper incremental removal of resin.

The present invention thus provides a continuous water softening system wherein a brine pulsing technique is applied in a convenient manner to a continuous regeneration of ion exchange resin without interruption of soft water service. Further, the brining and rinsing time can be selected substantially independently of the softening process and thus can provide a most efficient utilization of the improved brine pulsing technique.

Various modes of carrying out the invention are contemplated as being within the scope of the following claims particularly pointing out and distinctly claiming the subject matter which is regarded as the invention.

I claim:

1. A water softening system employing an ion exchange material which is periodically regenerated, comprising an ion exchange material flow means defining a multiple sectioned regenerating zone and a single section softening zone below said regenerating zone intercommunicating for flow of material intermittently therethrough, return means to control the flow of material from the regenerating zone to the softening zone, a raw water inlet at the bottom of the softening zone, an outlet for withdrawing softened water at the top of the softening zone, a transfer conduit from the bottom of the softening zone to the top of the regenerating zone forming a closed circuit for intermittently hydraulically lifting material from the softening zone for enabling it to serially drop through the several sections of the regenerating zone and then into the softening zone, a drain outlet for withdrawing liquid from the top of the regenerating zone during transfer of material through the transfer conduit, a brine-rinse line connected at the lower end of the regenerating zone for sequentially introducing brine and then rinse water into the regenerating zone to flow upward through the resin and exit through the drain outlet, and timer control means to control in sequence the transfer of an increment of material to the top of the regenerating zone, upflow brining of previously transferred increments and the newly transferred increment, upflow rinsing of the said increments, and return of the lowermost increment at the lower end of the regenerating zone back to the softening zone, the remaining increments of material remaining in the regenerating zone for the next transfer and regenerating cycle.

2. Water softening apparatus, comprising a softening tank having a hard water inlet at the lower end and a spaced soft water outlet at the upper end of the tank, ion exchange material disposed within the tank between the inlet and the outlet, a regeneration chamber above the softening tank having a drain line at the upper end and a brine-rinse line at the lower end of the chamber, an ion exchange material transfer conduit connected to the softening tank adjacent the hard water inlet and to the regeneration chamber adjacent the drain line for the intermittent transfer of increments of exhausted material from the softening tank to the top of the regeneration chamber on top of previously transferred increments, a material return line connected to the regeneration chamber adjacent the brine-rinse line and to the softening tank adjacent the soft water outlet, a source of brine connected to the brine-rinse line, a separate source of rinse water connected to the brine-rinse line, and timer control means to selectively and sequentially open and close said lines and transfer conduit to intermittently and sequentially transfer an increment of ion exchange material from the bottom of the softening tank through the transfer conduit to the top of the regeneration chamber onto previously transferred increments, to pass a brine solution upflow through the increments of material in the regeneration chamber, to subsequently pass rinse water upflow through the material increments, and thereafter to return the lowermost increment of material in the chamber through the resin return line to the softening tank.

3. Water softening apparatus as set forth in claim 2, including a transfer valve in the transfer conduit, a drain valve in the drain line, a brine valve between the brine source and the brine-rinse line, a rinse valve between the rinse water source and the brine-rinse line and a return valve in the material return line, said timer control means actuating these valves in proper sequence to provide for the transfer and regeneration of the material.

4. Water softening apparatus as set forth in claim 2, in which said rinse water source is the soft water outlet from the softening tank.

5. A method of regenerating ion exchange material utilized for the continuous softening of hard water passing through a bed of the ion exchange material, comprising the steps of periodically removing an increment of the ion exchange material from the bed to a regeneration chamber on top of previously removed increments of material, passing a brine solution through the previously removed increments and the newly removed increment of material as a continuous bed, subsequently passing a fresh water rinse through the increments of material in the regeneration chamber from the softening bed of material whereby each increment of material is subjected to a plurality of brine pulses separated by rinse pulses, and returning the lowermost increment to the ion exchange material bed.

6. A method of regenerating ion exchange material as set forth in claim 5, in which each increment of removed ion exchange material in the regeneration chamber is regenerated by brine pulses of increasing strength and concentration of brine until the increment is transferred, fully regenerated, back to the ion exchange material softening bed.

References Cited by the Examiner
UNITED STATES PATENTS 2,852,464  9/1958  Nordell _____ 210—33
3,056,743  10/1962  Eichhorn et al. ____ 210—189 X MORRIS O. WOLK, *Primary Examiner.*

E. G. WHITBY, *Assistant Examiner.*